US011556794B2

(12) United States Patent
Qian et al.

(10) Patent No.: US 11,556,794 B2
(45) Date of Patent: Jan. 17, 2023

(54) FACILITATING NEURAL NETWORKS

(71) Applicant: International Business Machines Corporation, Armonk, NY (US)

(72) Inventors: Haifeng Qian, Mt. Kisco, NY (US); Mark Wegman, Mt. Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1032 days.

(21) Appl. No.: 15/842,220

(22) Filed: Dec. 14, 2017

(65) Prior Publication Data

US 2019/0065956 A1 Feb. 28, 2019

Related U.S. Application Data

(60) Provisional application No. 62/552,843, filed on Aug. 31, 2017.

(51) Int. Cl.
*G06N 3/08* (2006.01)
*G06F 17/18* (2006.01)
(Continued)

(52) U.S. Cl.
CPC ............ *G06N 3/082* (2013.01); *G06F 17/16* (2013.01); *G06F 17/18* (2013.01); *G06N 3/049* (2013.01);
(Continued)

(58) Field of Classification Search
CPC ...... G06N 3/082; G06N 3/0454; G06N 3/049; G06N 3/084; G06N 3/088; G06N 5/003; G06N 7/005; G06F 17/16; G06F 17/18
See application file for complete search history.

(56) References Cited

U.S. PATENT DOCUMENTS 9,697,476 B1 * 7/2017 Prieditis ................. G06N 7/005
2017/0091619 A1 * 3/2017 Towal .................... G06N 3/084

FOREIGN PATENT DOCUMENTS

WO WO-1990016038 A1 * 12/1990 ............. G06F 15/80

OTHER PUBLICATIONS

He, Kaiming, Xiangyu Zhang, Shaoqing Ren, and Jian Sun. "Deep Residual Learning for Image Recognition." arXiv preprint arXiv:1512.03385 (2015). (Year: 2015).*
(Continued)

*Primary Examiner* — Casey R. Garner
(74) *Attorney, Agent, or Firm* — Amin, Turocy & Watson, LLP

(57) ABSTRACT

Techniques for improved neural network modeling are provided. In one embodiment, a system comprises a memory that stores computer-executable components and a processor that executes the components. The computer-executable components can comprise a loss function logic component that determines a penalty based on a training term, the training term being a function of a relationship between an output scalar value of a first neuron of a plurality of neurons of a neural network model, a plurality of input values from the first neuron, and one or more tunable weights of connections between the plurality of neurons; an optimizer component that receives the penalty from the loss function component, and changes one or more of the tunable weights based on the penalty; and an output component that generates one or more output values indicating whether a defined pattern is detected in unprocessed input values received at the neural network evaluation component.

23 Claims, 11 Drawing Sheets

(51) Int. Cl.
  G06F 17/16    (2006.01)
  G06N 3/04     (2006.01)
  G06N 7/00     (2006.01)
  G06N 5/00     (2006.01)

(52) U.S. Cl.
  CPC ........... *G06N 3/0454* (2013.01); *G06N 3/084* (2013.01); *G06N 3/088* (2013.01); *G06N 5/003* (2013.01); *G06N 7/005* (2013.01)

(56) References Cited

OTHER PUBLICATIONS

Matsuoka, Kiyotoshi, and J. Yi. "Backpropagation based on the logarithmic error function and elimination of local minima." In [Proceedings] 1991 IEEE International Joint Conference on Neural Networks, pp. 1117-1122. IEEE, 1991. (Year: 1991).*

Madhiarasan, M., and S. N. Deepa. "A novel criterion to select hidden neuron numbers in improved back propagation networks for wind speed forecasting." Applied intelligence 44, No. 4 (2016): 878-893. (Year: 2016).*

Linsker, "Self-Organization in a Perceptual Network," Computer, vol. 21, Issue 3, Mar. 1988, pp. 105-117, 13 pages.

Linsker, "From basic network principles to neural architecture: Emergence of spatial-opponent cells," Proceedings of the National Academy of Science USA, vol. 83, Oct. 1986, pp. 7508-7512, 5 pages.

Linsker, "From basic network principles to neural architecture: Emergence of orientation-selective cells," Proceedings of the National Academy of Science USA, vol. 83, Nov. 1986, pp. 8390-8394, 5 pages.

Oja's rule; https://en.wikipedia.org/wiki/Oja%27s_rule, 5 pages.

Madry et al., "Towards Deep Learning Models Resistant to Adversarial Attacks," arXiv:1706.06083v3 [stat.ML], Nov. 9, 2017, 27 pages.

Carlini et al., "Defensive Distillation is Not Robust to Adversarial Examples," arXiv:1607.04311v1 [cs.CR], Jul. 14, 2016, 3 pages.

Linsker, "How to Generate Ordered Maps by Maximizing the Mutual Information between Input and Output Signals," Neural Computation 1, 1989, pp. 402-411, 10 pages.

* cited by examiner

FACILITATING NEURAL NETWORKS

TECHNICAL FIELD

The subject disclosure relates to neural networks, and more specifically, to improved neural networks having a training term added to a loss function to provide for enhanced operation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate modeling neural networks using an improved loss function are described.

According to an embodiment, a system is provided that can comprise a memory that stores computer-executable components and a processor that executes computer-executable components stored in the memory. In one or more implementations, the computer-executable components can comprise a loss function logic component that determines a penalty based on a training term, wherein the training term is a function of a relationship between an output scalar value of a first neuron of a plurality of neurons of a neural network model, a plurality of input values from the first neuron, and one or more tunable weights of connections between the plurality of neurons. The computer-executable components can further comprise an optimizer component that receives the penalty from the loss function component, and changes one or more of the tunable weights based on the penalty. The computer-executable components can further comprise an output component that generates one or more output values indicating whether a defined pattern is detected in unprocessed input values received at the neural network evaluation component.

In another embodiment, a computer-implemented method is provided. In one example, the computer-implemented method comprises determining, by a system operatively coupled to a processor, a penalty based on a training term, wherein the training term is a function of a relationship between an output scalar value of a first neuron of a plurality of neurons of a neural network model, a plurality of input values from the first neuron, and one or more tunable weights of connections between the plurality of neurons. The computer-implemented method can further comprise receiving, by the system, the penalty, and changing one or more of the tunable weights based on the penalty. The computer-implemented method can further comprise generating, by the system, one or more output values indicating whether a defined pattern is detected in unprocessed input values received at the neural network model.

In another embodiment, a computer program product is provided, the computer program product comprising a computer readable storage medium having program instructions embodied therewith. The program instructions executable by a processor can cause the processor to at least determine, by the processor, a penalty based on a training term, wherein the training term is a function of a relationship between an output scalar value of a first neuron of a plurality of neurons of a neural network model, a plurality of input values from the first neuron, and one or more tunable weights of connections between the plurality of neurons. The program instructions executable by a processor can further cause the processor to at least receive, by the processor, the penalty, and changing one or more of the tunable weights based on the penalty. The program instructions executable by a processor can cause the processor to at least generate, by the processor, one or more output values indicating whether a defined pattern is detected in unprocessed input values received at the neural network model.

In yet another embodiment, a system comprising an artificial neural network (ANN) is provided. The ANN can comprise: a first neuron of a plurality of neurons; one or more of a first set of neurons of the plurality of neurons and connected to the first neuron with a first set of one or more weight values; and one or more of a second set of neurons of the plurality of neurons coupled to the first neuron with a second set of one or more weight values, and wherein the first set of neurons is adjacent to the first neuron and the second set of neurons is remote from the first neuron. The system can also comprise a memory that stores computer executable components; and a processor that executes the computer executable components stored in the memory. In one or more implementations, the computer-executable components can comprise a weight calculation logic component that updates the first set of one or more weight values with a first magnitude that is larger than a second magnitude with which the weight calculation logic component updates the second set of neurons.

In yet another embodiment, a computer program product for facilitating an artificial neural network is provided. The computer program product can comprise a computer readable storage medium having program instructions embodied therewith, the program instructions are executable by a processor to at least: implement, by the processor, a first neuron of a plurality of neurons; implement, by the processor, one or more of a first set of neurons of the plurality of neurons and connected to the first neuron with a first set of one or more weight values; implement, by the processor, one or more of a second set of neurons of the plurality of neurons coupled to the first neuron with a second set of one or more weight values, and wherein the first set of neurons is adjacent to the first neuron and the second set of neurons is remote from the first neuron; and update, by the processor, the first set of one or more weight values with a first magnitude that is larger than a second magnitude with which the second set of neurons is updated.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As used herein, the terms "artificial neural networks (ANNs)" and "neural networks" are interchangeable. ANNs have been modeled and simulated for several decades. In general, these models mimic real biologic neurons by creating arrays of neurons and connections that connect each neuron to a smaller local subset of the entire array of neurons. Biological neurons are connected with an elongated axon (e.g., nerve cell) extending from one neuron to another neuron and connected to the next neuron with a synapse. Synapses control connection strengths with various structural and chemical techniques. In one or more embodiments described herein, in ANNs the connections between neurons can be modeled as weights, $w_i$, or weight values indicating for each pair of neurons how strong the connections are between each pair of connected neurons.

Figure 1:
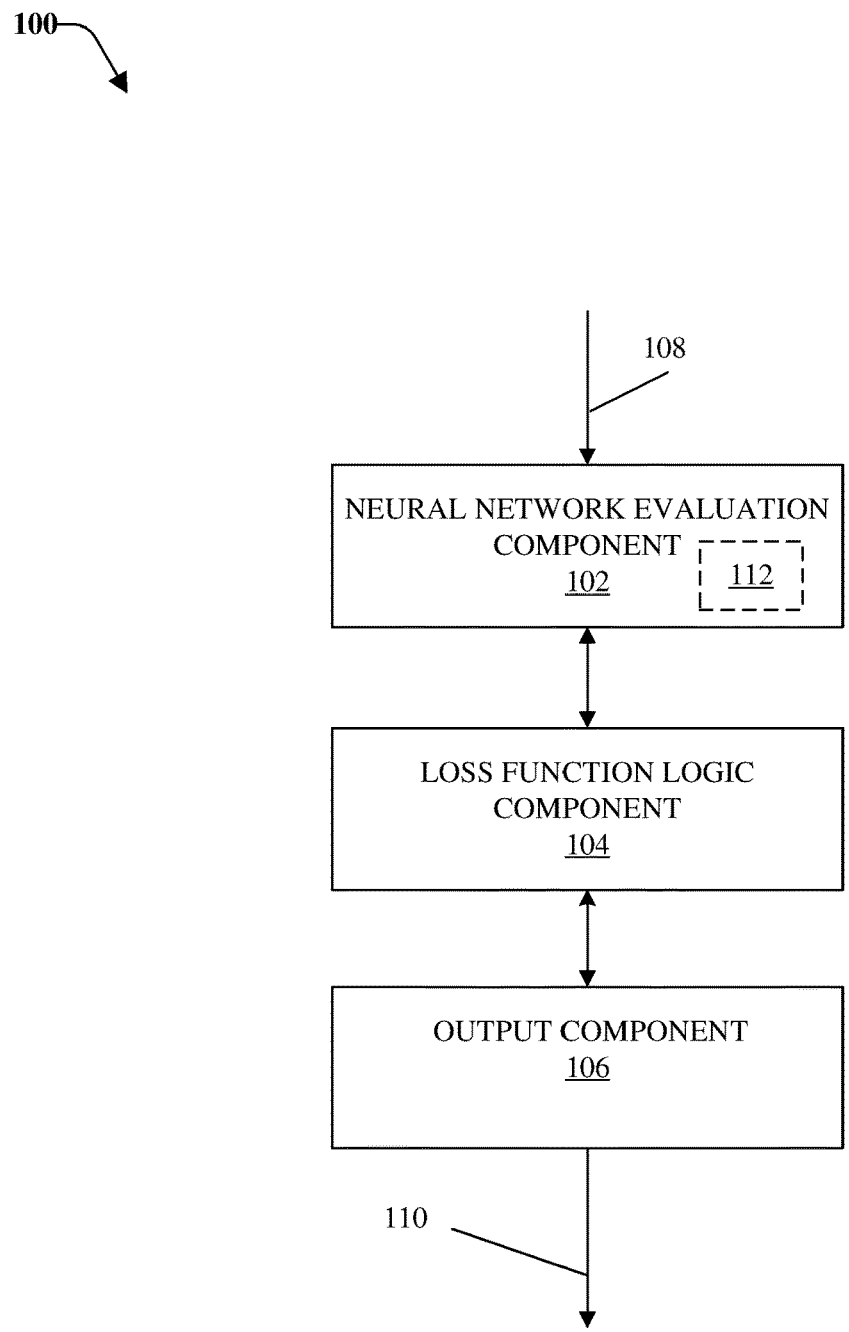
FIG. 1 illustrates a block diagram of an example, non-limiting system that facilitates an improved neural network in accordance with one or more embodiments described herein.

FIG. 1 illustrates a block diagram of an example, non-limiting system that implements a neural network model (e.g., an ANN). Moreover, the system 100 can be associated with or be at least partially included in any system in which neurons or versions of neuron functionality is modeled and/or implemented in software, hardware or a combination of both.

The system 100 can be employed to use hardware and/or software to solve problems that are highly technical in nature, that are not abstract and that cannot be performed as a set of mental acts by a human. For example, it is impossible for a human to perform the storage of weights as well as the updating of weights and determination of patterns that is employed in neural network processing. Further, some of the processes performed can be performed by a specialized computer with specialized instructions for implementing one or more features or action(s) performed by a biological neuron, a neuron model, or another type of implementation. Additionally, specialized hardware can be implemented to perform at least some characteristics or operations of a biological neuron.

In one or more embodiments described herein, system 100 can be set with default weights and other parameters and then trained on known data. Various embodiments can use any suitable training method. For example, the training can be supervised or unsupervised, trained with known data, trained using forward and backward propagation to train connection weights of neurons, using known training data, and/or trained in other ways.

In some embodiments, the system 100 can be part of or implement a machine learning system, a deep learning system, and/or another artificially intelligence (AI) training system. In some embodiments, system 100 can be part of or implement a machine learning system that is constructed to divide a task into discrete different subtasks in the process of arriving at a conclusion. For example, to find a dog in an image, machine learning can first find individual objects in an image. Secondly, determine which of those objects can be a mammal (dogs, cats, humans, etc.), and, thirdly, determine which of those mammals is a dog. Machine learning can also include smaller ANNs corresponding with those ANNs corresponding to a subtask to assist with learning and later performing the subtasks. In contrast, a deep learning system is not provided or imposed upon to perform subtasks. Instead, a deep learning system uses its large number of neurons to, in general, create a large ANN that can be formed with many layers of neurons placed upon each other. When a deep ANN is presented to the same image discussed previously, propagation of signals through the many (deep) layers can be facilitated one or more patterns are detected. All such embodiments, including machine learning, deep learning and/or AI are envisaged for system 100 herein.

Because ANNs excel at finding patterns in large batches of data, similar to a biological neural network and as opposed to sequential processors/computers that have great difficulty finding patters in related data, one or more embodiments of the ANNs described herein can be employed to find patterns and/or trends in data that have at least some common characteristics. Thus, the system 100 can be or be included in speech recognition systems, image recognition systems, graphical modeling systems, bioinformatics systems, data compression systems, artificial intelligence system, authentication systems, syntactic pattern recognition systems, medical systems, health monitoring systems and/or the like.

In one example, the system 100 can be a neural network (e.g., an ANN, a machine learning neural network, etc.) associated with interconnected deep learning that provides an estimated functional model from a set of unknown inputs. It is conceived that in some embodiments, the system 100 can be associated with a Bayesian network that can provide a graphical model that represents relationships between a set of variables (e.g., a set of random variables). In yet another embodiment, the system 100 can be associated with a hidden Markov model that models data over a continuous time interval and/or outputs a probability distribution. However, the system 100 can alternatively be associated with a different machine learning system such as, but not limited to, a clustering machine learning system, a decision tree machine learning system, an instance-based machine learning system, a regression machine learning system, a regularization machine learning system, rule learning machine learning system, or a different types of learning systems to facilitate a deep learning process or another type of learning process.

In the embodiment shown in FIG. 1, the system 100 can include a neural network evaluation component 102, a loss function logic component 104, and an output component 106 that can be electrically and/or communicatively coupled to one another. While not shown, the neural network evaluation component 102, loss function logic component 104 and the output component 106 can each include a memory (not shown) and a processor (not shown). For example, the neural network evaluation component 102, a loss function logic component 104, and an output component 106 can include or be operatively coupled to at least one memory and at least one processor. The at least one memory can store executable instructions that when executed by the at least one processor, facilitate performance of operations defined by the executable instruction. Examples of the processor and memory, as well as other suitable computer or computing-based elements, can be found with reference to FIG. 11, and can be used in connection with implementing one or more of the systems or components shown and described in connection with FIG. 1 or other figures disclosed herein.

The system 100 can also include an input line or bus 108 that operatively communicates inputs into the neural network evaluation component 102 and an output line or bus 110 that outputs signals from the output component 106.

"Processor", "Logic", and "Logic Component" as used herein, includes but is not limited to hardware, firmware, software and/or combinations of each to perform a function(s) or an action(s), and/or to cause a function or action from another logic, method, and/or system. For example, based on a desired application or need, logic and/or processor can be include a software-controlled microprocessor, discrete logic, an application specific integrated circuit (ASIC), a programmed logic device, a memory device containing instructions or the like. Logic and/or processor can be include one or more gates, combinations of gates, or other circuit components. Logic and/or a processor can also be fully embodied as software. Where multiple logics and/or processors are described, it can be possible to incorporate the multiple logics and/or processors into one physical logic (or processors). Similarly, where a single logic and/or processor is described, it can be possible to distribute that single logic and/or processor between multiple physical logics and/or processors.

Hebb's rule states that neurons (cells) that fire together, wire together. There are many ways to translate that into mathematical formulations, each associated with an explanation of its purpose. Simulating these formulations in artificial neural networks (ANNs) has shown interesting behaviors, but these functions have previously not been successful enough to have wide adoption in prior art ANNs, until the embodiments described herein.

Another hypothesis explains mathematically why evolution appears to have chosen Hebb's rule. As discussed below, this hypothesis provides practical guidance on how to build ANNs that are similar to biological neural networks. This hypothesis provides a practical guidance to produce improved artificial neurons and ANNs. For example, Hebb's rule provides guidance for building classifiers (of image data, graphical data, and other data with shared characteristics) with better generalization, so much so that results based on this guidance withstands white-box adversarial-example attacks.

A biological neuron is modeled to implement equation (1):

$$Y = f(w^T X; \theta_f) \qquad (1)$$

The variable Y is an output scalar, X is a vector of input values from other neurons, f is a non-linear function, w is a vector of tunable weight parameters, and $\theta_f$ represents tunable parameters off. Thus, it validly assumes that a biological neuron is similar to an artificial neuron, but with a more complex f. This assumption is biologically plausible because Y and X values are encoded in log scale by the timing of neuron spikes, magnitude of each entry in w is encoded in log scale by the latency of a synapse, and negative entries in w correspond to inhibitory synapses.

The inner product term in of equation (1) can be written as equation (2):

$$Y' = w^T X \qquad (2)$$

It is then straightforward to verify:

$$c_{Y',X} = \Sigma(X) \cdot w \qquad (3)$$

Where $c_{Y',X} = (\text{cov}(Y', X_1), \ldots, \text{cov}(Y', X_k))^T$, and $\Sigma(X)$ is the covariance matrix of X.

The following gives an example for weighted sampling by Y to determine associated covariance. In this example, vector $c_{Y',X}$ and vector $r_{Y',X}$ can be calculated by weighted average over samples, and the weights can be based on their sample Y values. For example, for a neuron with a rectified linear unit, a higher weight may be given to samples where sample Y values are positive. Given that, an entry in $c_{Y',X}$ can be expressed as:

$$\text{cov}(Y', X_i) = \frac{\sum_{\text{sample } j} v_j x_{i,j} y'_j}{\sum_{\text{sample } j} v_j} - \frac{\sum_{\text{sample } j} v_j x_{i,j}}{\sum_{\text{sample } j} v_j} \cdot \frac{\sum_{\text{sample } j} v_j y'_j}{\sum_{\text{sample } j} v_j}$$

where $$v_j = \begin{cases} \alpha, & \text{if } y'_j > 0 \\ 1, & \text{otherwise.} \end{cases}$$

In the above equation, $\alpha$ is a hyperparameter that is greater than 1. A modified equation for $r_{Y',X}$ can be expressed in a similar manner.

The following gives an example for weighted sampling by X. Similar to the above example concerning weighted sampling by Y, samples can be weighted by X when calculating $c_{Y',X}$ or $r_{Y',X}$. For example, if a neuron receives inputs from rectified linear units, a higher weight may be given to samples where sample X values are positive. Given that, an equation for an entry in $c_{Y',X}$ can be expressed as:

$$\text{cov}(Y', X_i) = \frac{\sum_{\text{sample } j} v_{i,j} x_{i,j} y'_j}{\sum_{\text{sample } j} v_{i,j}} - \frac{\sum_{\text{sample } j} v_{i,j} x_{i,j}}{\sum_{\text{sample } j} v_{i,j}} \cdot \frac{\sum_{\text{sample } j} v_{i,j} y'_j}{\sum_{\text{sample } j} v_{i,j}}$$

where

-continued $$v_{i,j} = \begin{cases} \alpha, & \text{if } x_{i,j} > 0 \\ 1, & \text{otherwise.} \end{cases}$$

In the above equation, α is a hyperparameter that is greater than 1. A modified equation for $r_{Y',X}$ can be expressed in a similar manner.

A common property of both the above example of weighted sampling by Y, and the above example of weighted sampling by X can be that each neuron is regularized based on a different distribution. That is, where in some examples all of the neurons in an artificial neural network that are regularized are regularized with a single (possibly unweighted) distribution of input training data, here, a separate distribution may be used for each neuron.

If Hebb's rule is simply nature's way of asking for a linear correlation between $c_{Y',X}$ and w, then in a Hebbian steady state, w is an eigenvector of $\Sigma(X)$. Conversely, any eigenvector of $\Sigma(X)$ is a Hebbian steady state. In other words, nature has a simple feature selection criteria that each neuron can choose a filter from the eigenvectors of the covariance matrix of its input neurons. This is consistent with the need for survival. For example, consider sitting on a tree on a prairie and watching the environment. There are likely variation sources with large eigenvalues such as a sunrise or sunset and there can be more subtle variation sources such as an animal running by or an approaching lion. It is generally beneficial for animals to develop separate filters for independent variation sources, especially filters that help the mammal survive, even though some have small eigenvalues.

In an alternative form, equation (3) becomes:

$$r'_{Y'}, x = \frac{1}{\sigma Y'} \cdot corr(X) \cdot w \qquad (4)$$

where $r_{Y'},x=(r_{Y'}, x_1, \ldots, r_{Y'}, x_k)^T$ is the vector of correlation coefficients, corr (X) is the correlation matrix of X, σ Y' is the standard deviation of Y', and $w'=(w_1, \sigma_1, \ldots, w_k \sigma x_k)^T$. An alternative hypothesis is that Hebb's rule is enforcing a linear correlation between $r_{Y'},x$ and w'. Hence in a Hebbian steady state, w' is an eigenvector of corr(X). Conversely, an eigenvector of corr(X) is a steady state for w'.

Both alternatives are plausible. Preliminary Modified National Institute of Standards and Technology (MNIST) experiments work better with the former. However, the latter can amplify weak signals.

There are many previous mathematical treatments of Hebb's rule. Oja's rule and its variants will be discussed, as they are both popular and representative in terms of convergence behavior. Oja's rule applies iteratively on a single artificial neuron $Y'=w^T X$ with zero-mean inputs X, and the steady state w is the eigenvector of $\Sigma(X)$ with the largest eigenvalue.

Oja's rule with the Gram-Schmidt process, also known as a generalized Hebbian algorithm, is a variant that applies on multiple neurons which share the same zero-mean inputs X. The steady state for w vectors is such that the first w is the eigenvector of $\Sigma(X)$ with the largest eigenvalue, and second w is one with the second largest eigenvalue, and so on.

The important distinction is that previous embodiments of Hebb's rule found the top-K eigenvectors. To achieve that, neurons communicate with each other and perform orthogonalization when they evolve together. In contrast, the first form of this embodiment claims that any eigenvector of $\Sigma(X)$, even one with the smallest eigenvalue, is precisely a Hebbian steady state for w, and that each neuron (or at least some neurons) can evolve individually and independently to become any eigenvector.

In a brain, a layer of neurons can use a subset of eigenvectors of the covariance or correlation matrix from its input layer, and this subset contains features that are useful and not necessarily ones with large eigenvalues. With the same example earlier, possibly the features a mammal's brain chooses are ones that help to catch an animal, although they are from subtle variation sources with small eigenvalues. Also, each neuron can evolve by itself toward Hebbianness and there is no need for cross-layer communication to accomplish this result.

The above observations analyzed with respect to biological neurons are now applied when building ANNs in one or more embodiments described herein. The consequence is that, in one or more embodiments described herein, a neuron in an ANN can use an arbitrary eigenvector rather than one from the top-K, and this can lead to improvements and benefits in building ANNs as discussed below.

In one or more embodiments described herein, while training an ANN, an extra term is added to the loss function according to the first form of the hypothesis discussed above. This term can be considered a training term and can be as shown in equation 5:

$$-\Sigma_{neuron\ i}\ \log\frac{r_{c_{Y',X},w}+1}{2} \qquad ($$

where $r_{c_{Y',X},w}$ the reflective correlation coefficient between $c_{Y',X}$ and w, and note that Y', X and w can be different for different neurons. In some embodiments, alternatively equation 5 can be:

$$-\Sigma_{neuron\ i}\ \log\frac{r_{r_{Y',X},w'}+1}{2} \qquad ($$

where $r_{r_{Y',X},w'}$ is the reflective correlation coefficient between $r_{Y',X}$ and w', and again Y',X and w' are different for different neurons.

Such an extra loss term (e.g., the training term) can be a form of regularization and encourage an ANN to move towards weights that conform to our hypothesis. This can be called Hebbian regularization.

Note that equations (5) and (6) are examples and in other embodiments there can be many possible formulations that have similar effects. In some embodiments, the extra loss term (e.g., the training term) can also be normalized or weighted by hyperparameters, and the term can be split to have different degrees of emphasis on Hebbianness in different layers of an ANN. All such embodiments are envisaged.

With example equations (5) or (6), the covariance matrices or the correlation matrices are not explicitly needed. When training, the extra computational cost to evaluate and differentiate the Hebbian loss term can be dominated by evaluating and differentiating $c_{Y',X}$ in (5) or $r_{Y',X}$ in (6), which is roughly the same as evaluating and differentiating Y'. Therefore, theoretically it can be expected for the training time to double. However, due to lack of CUDA® Deep Neural Network (cuDNN) support like there is for convolution, a ten to twenty times difference in training time was initially observed and a larger-than-necessary consumption of graphics processing unit (GPU) memory.

By adding equation (5) or equation (6) to the loss function, the effect on the training optimization is not only modifying the gradient with respect to w of this specific neuron, but also modifying the gradient with respect to parameters of its input neurons, and those of the inputs to the input neurons, and so on, going all the way upstream. A reason for this is that (5) and (6) are differentiable functions with respect to X, which allows—for example—the standard backpropagation algorithm to modify gradients with respect to remote parameters.

MNIST Test Results

Public MNIST data demonstrates that ANNs trained with Hebbian regularization generalize better. Specifically, using robustness against white-box adversarial-example attacks can be used to demonstrate these results. These results also serve as indirect evidence to support the above hypothesis on biological neural networks.

Previous white-box attacks have had a near 100% success rate. One publicized attack is a particularly strong attack and has defeated all networks that were put to the test of surviving that attack. A mainstream defense mechanism is adversarial training, which has achieved some level of robustness against black-box attacks and transfer attacks, but has been unable to reduce the near 100% success rate of white-box attacks. A single paper claims substantial defense against white-box attacks. It reported a MNIST classifier that withstands 89.3% of certain attacks if the attacks are limited to 100 iterations.

In contrast, when the original attack code is run on the above examples of ANNs implemented with the above Hebbian regularization and if the attacks are limited to 40 iterations, ANNs based on Hebbian regularization withstand 97.4% of attacks. If the attacks are limited to 100 iterations, ANNs based on Hebbian regularization withstand 88.1% of attacks. If running with the original iteration limit of 1000, the same Hebbian ANNs withstand 49.3% of attacks.

When attaining the above results, the training process of the Hebbian ANNs did not involve adversarial training. The MNIST training data was used as is, and the Hebbian regularization loss term in equation (5) was added to the normal cross-entropy loss. Thus, there was no training to defend adversarial-example attacks, and yet the Hebbian ANNs achieved the same level of defense as extensively adversarial trained prior art ANNs. This demonstrates one of the benefits, namely better generalization, of Hebbian regularization. Hebbianness indicates great potential in other aspects of ANNs, including interpretability, unsupervised learning, semi-supervised learning and more.

Based on the above discussion of ANNs created using concepts of Hebbian regularization, example source code (on TensorFlow API as an example) to compute the proposed Hebbian loss for a convolutionary layer in an artificial neural network can be listed, as understood by those of ordinary skill in this art, as follows:

```
def convLinearity(w, inLayer, outLayer, dim1, dim2, conv):
    padded=tf.pad(inLayer,[[0,0],[int((conv[0]-1)/2),int((conv[0]-1)/2)],[int((conv[1]-1)/2),int((conv[1]-1)/2)],[0,0]], 'CONSTANT')
    t2=tf.stack([[tf.slice(padded,[0,i,ii,0],[-1,dim1,dim2,-1]) for ii in range(conv[1])] for i in range(conv[0])])
    prod=tf.tensordodt2,outLayer,[[2,3,4],[0,1,2]])*float(conv[3])
    /tf.cast(tf.size(outLayer),tf.float32)
    ma=tf.reduce_mean(outLayer, [0,1,2])
    mean1=[[[ma for iii in range(conv[2])] for ii in range(conv[1])] for i in range(conv[0])]
    mb=tf.reduce_mean(t2,[2,3,4])
    mean2=tf.stack([mb for i in range(conv[3])],3)
    cov=prod-tf.multiply(mean1,mean2)
    xprod=tf.reduce_mean(tf.multiply(w,cov), [0,1,2])
    v1=tf.reduce_mean(tf.multiply(w,w), [0,1,2])
    v2=tf.reduce_mean(tf.multiply(cov,cov), [0,1,2])
    corr=(xprod+1e-10)/tf.sqrt(tf.multiply(v1+1e-10,v2+1e-10))
    return-tf.reduce_mean(tf.log(corr*0.5+0.5))
```

Additional example source code (on TensorFlow application programming interface (API), as an example) to compute the proposed Hebbian loss for a dense layer in a dense neural network can be listed, as understood by those of ordinary skill in this art, as follows:

```
def linearity(w, inLayer, outLayer, dim1, dim2):
    prod=tf.matmul(inLayer,outLayer,True,False)
    /tf.cast(tf.shape(outLayer)[0],tf.float32)
    ma=tf.reduce_mean(inLayer,[0])
    meana=tf.stack([ma for i in range(dim2)],1)
    mb=tf.reduce_mean(outLayer,[0])
    meanb=tf.stack([mb for i in range(dim1)])
    cov=prod-tf.multiply(meana,meanb)
    xprod=tf.reduce_mean(tf.multiply(w,cov),0)
    v1=tf.reduce_mean(tf.multiply(w,w),0)
    v2=tf.reduce_mean(tf.multiply(cov,cov),0)
    corr=(xprod+1e-10)/tf.sqrt(tf.multiply(v1+1e-10,v2+1e-10))
    return-tf.reduce_mean(tf.log(corr*0.5+0.5))
```

Returning to FIG. 1, in some embodiments, the neural network evaluation component 102 can be preloaded with a neural network model 112. In other embodiments, the neural network evaluation component 102 can receive inputs from the input line 108 that specify a neural network model 112 that the neural network evaluation component 102 can create. The neural network model 112 can implement neurons and can implement connections represented by tunable weights between the neurons. In some implementations, individual neurons can be associated with at least one tunable weight that indicates how strongly a particular neuron is connected to another neuron. The stronger the connection, the stronger the influence on the other neuron. The neural network evaluation component 102 can implement neural network models with software, pre-created hardware logic (similar to a field-programmable gate array (FPGA)), and/or a combination of both.

In an example embodiment, the loss function logic component 104 can change one or more of the tunable weights of the neurons based on a loss function that comprises a training term. The loss function logic component 104 can perform these changers during an initial training period of the neural network model 112 in some embodiments. These changes can be made at other times when non-supervised learning is implemented and/or at other appropriate times as understood by those of ordinary skill in this art. In some embodiments, the training term is a function of a correlation coefficient between a covariance between an output scalar value of the neurons and the input values from the neurons and the tunable weights as discussed above with reference to equation (5). Of course, the input values can correspond to neurons connected to the neuron of interest that is currently being updated.

In at least one embodiment, the output component 106 can generate one or more output values. These output values, indicate whether a defined pattern is detected in unprocessed input values received at the neural network evaluation component. For example, during a non-learning operation mode, the system 100 can provide outputs found in image data presented to the system, predict trends in financial data and report them as output possible with neural network prediction on a probability of the trend and possible alternative trends, other similar example of extracting patterns from data sharing some common characteristics. These types of applications and outputs are often produced with much higher accuracy (finding cancer in medical images) from systems similar to the system 100 of FIG. 1 than a human can perform, if a human is even capable of performing similar tasks.

In some embodiments, the pattern for which the system 100 is searching does not need to be specified exactly but, rather, generally/loosely defined with boundaries and ranges as understood by those of ordinary skill in the art. The defined pattern can be indicative of: an item of interest in an image, a trend of economic data, and a trend of data over a time period that has at least some data associated with other data at different times of the time period, and other characteristics of interest of data.

Figure 2:
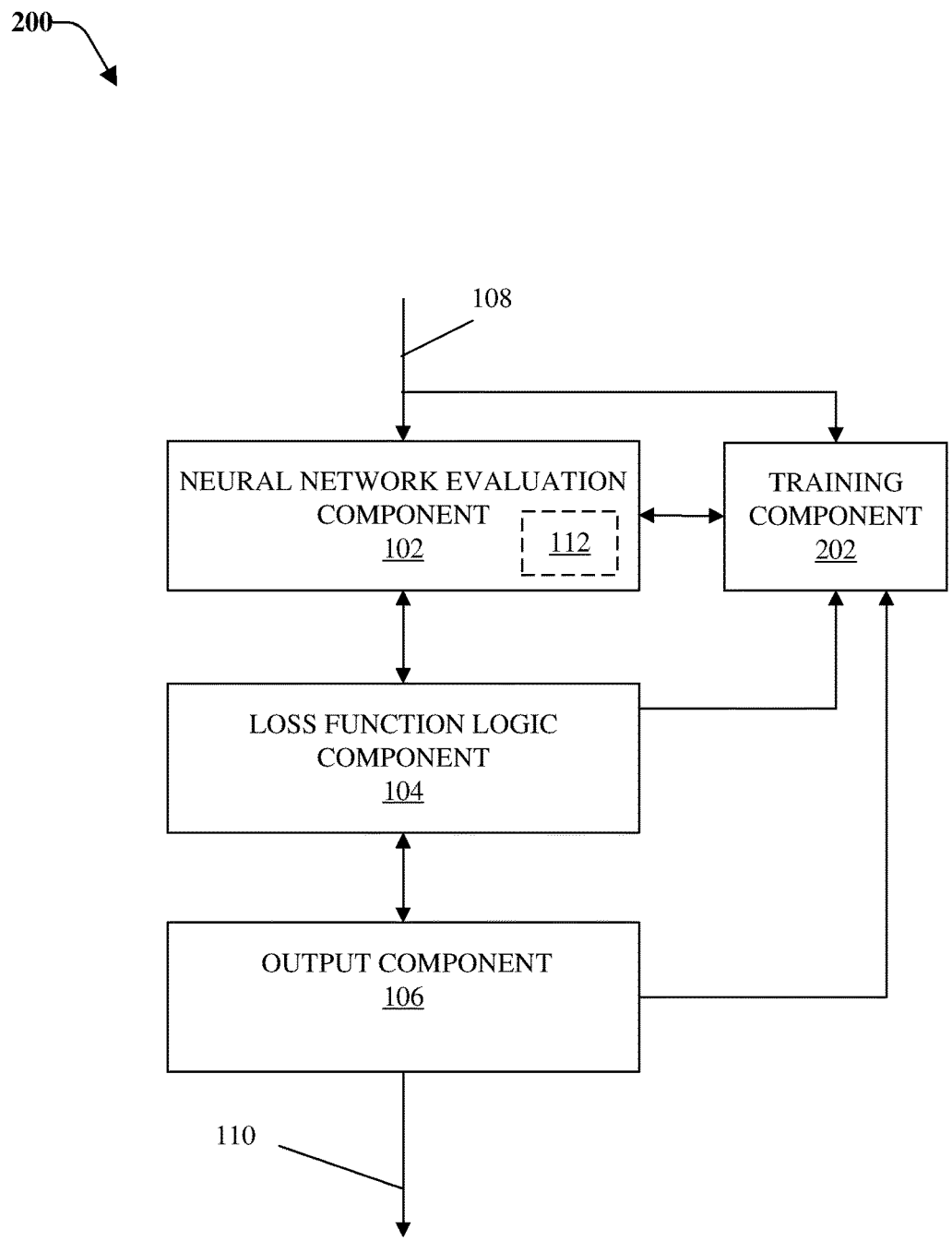
FIG. 2 illustrates another block diagram of an example, non-limiting system that facilitates an improved neural network in accordance with one or more embodiments described herein.

Another embodiment is illustrated in FIG. 2 in which a system 200 similar to the system 100 of FIG. 1 includes a training component 202. Repetitive description of like embodiments employed in respective embodiments is omitted for sake of brevity.

The training component 202 can train the neural network model 112 with a goal to produce outputs at one or more output neurons based on corresponding input values applied to the plurality of input neurons. Thus, the training performed by the training component 202 and the adjusting of weights by the loss function logic component 104 can operate with a goal to train quickly and according to Hebb's law the neural network model so that it produces well correlated output data with respect to input data.

In another embodiment, the systems 100, 200 can further include a number of layers of neurons. For example, the neural network evaluation component 102 can create a neural network model 112 having a first layer of hidden neurons, a second layer of hidden neurons beneath the first layer of hidden neurons, and a third layer of hidden neurons beneath the second layer of hidden neurons, and a layer of output neurons. Of course, each of these layers (input, hidden, and output) can have multiple layers, and the neural network model 112 can have other configurations and/or types of layers as desired.

Figure 3:
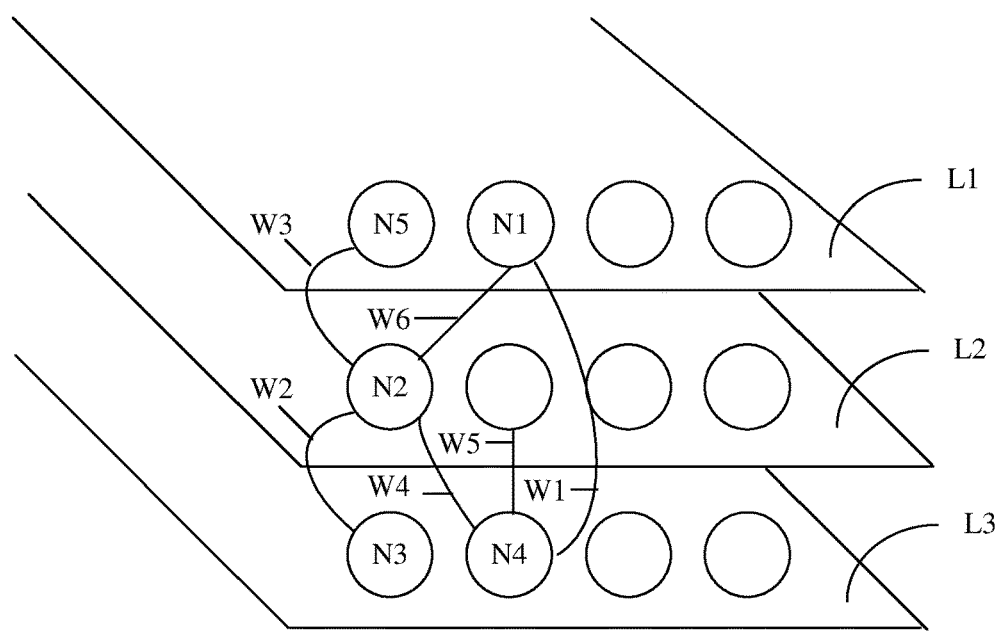
FIG. 3 illustrates an example diagram illustrating how neuron weight values for directly connected and indirectly connect neurons can be updated in accordance with one or more embodiments described herein.

In some configurations, referring to FIG. 3, a neural network model 300 can have a third neuron N3 in the third layer L3 of hidden neurons connected to a second neuron N2 in the second layer L2 of hidden neurons with a second weight W2. A fourth neuron N4 in the third layer L3 of hidden neurons can be directly connected to a first neuron N1 in the first layer of hidden neurons with a first weight W1 different than the second weight W2. Additionally, the second neuron N2 in the second layer L2 can be directly connected to a fifth neuron L5 in the first layer L1 with a third weight W3 different than the first weight W1 and different than the second weight W2.

By way of other examples and embodiments, the fourth neuron N4 can be directly connected to the second neuron N2 with a fourth weight W4. Furthermore, the loss function logic component 104 upon updating the third weight W3 can update it with a lower magnitude of change of a magnitude of change of the fourth weight W4. This is because the third weight W3 from the fifth neuron N5 "passes through" the second neuron N2 before reaching the fourth neuron N4 while the fourth weight W4 is directly (no pass-through) connected between the second neuron N2 and the fourth neuron N4.

As a final example, the second neuron N2 can be connected to the first neuron N1 with a sixth weight W6. Because the sixth weight W6 passes through the second neuron N2 before reaching the fourth neuron N4, Hebb's law would highly emphasis that the first weight W1 connecting the first node N1 and the fourth neuron N4 should be updated more strongly than the sixth weight W6. Of course, other configurations are possible than what is shown in the examples of FIG. 3.

Figure 4:
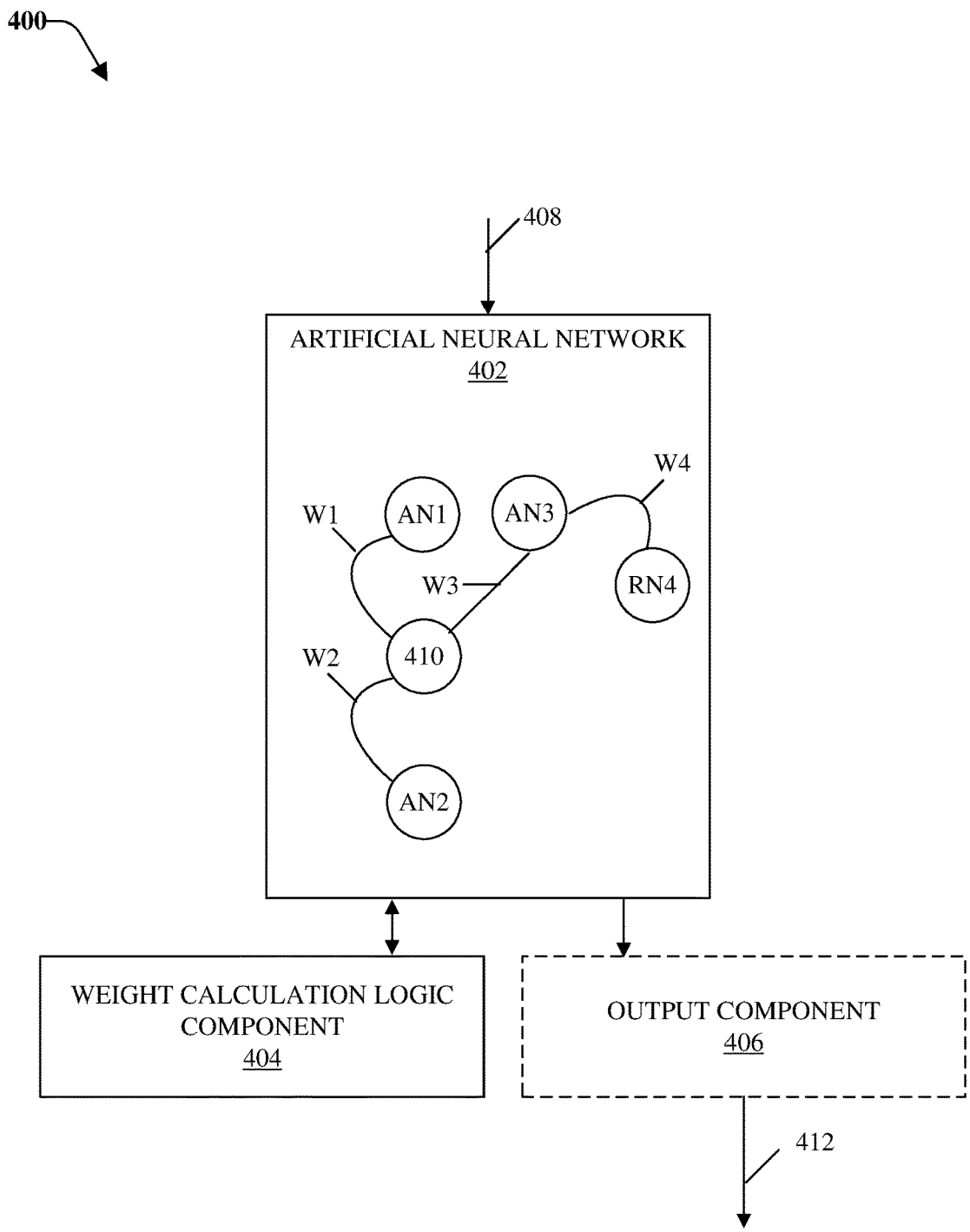
FIG. 4 illustrates another block diagram of an example, non-limiting system that facilitates, based in part on Hebb's law an improved neural network in accordance with one or more embodiments described herein.

Another embodiment of an example system 400 implementing Hebb's law is illustrated in FIG. 4. Repetitive description of like embodiments employed in respective embodiments is omitted for sake of brevity.

The system can include an artificial neural network (ANN) 402 and a weight calculation logic component 404. The ANN 402 includes a first neuron 410, one or more adjacent neurons A1-3 directly connected to the first neuron 410 with one or more weight values W1-3, and one or more remote neurons RN1 coupled to the first neuron 410 with weight values. At least one of the one or more remote neurons (RN1 in FIG. 4) can be coupled to the first neuron 410 with at least one intermediate neuron AN3 between the first neuron 410 and the remote neuron RN1.

The weight calculation logic component 404 can update one or more weights of neurons connected to the first neuron 410. The weight calculation logic component can update weights of adjacent neurons directly calculated to the first neuron 410 with larger changes in magnitude of the weight values than changes in magnitude of the weight values of corresponding to remote neurons passing through corresponding adjacent neurons. Thus, Hebb's law would favor updating W1-3 with an amount more than an amount used to update W4.

In some embodiments, the system 400 can be or include an output component logic 406. The output component logic can determine if inputs to a correlation of input values to the ANN 402 are recognized to match a known pattern. When the ANN 402 recognizes a known pattern, the ANN 402 can generate output values indicating the known pattern was detected and/or can output that information on output line(s) 412. In some embodiments, output component logic 406 can provide an indication of the known pattern. The known pattern can be associated with one or more of: image data, medical data, a trend in data over a timeframe, or other types of related data.

In another embodiment, if the weight calculation logic component 404 is in a training mode, the weight calculation logic component 404 can increase weights of neurons that helped the first neuron 410 to fire in response to training data that should prompt the first neuron to fire and decreases weights of neurons that do not help the first neuron 410 fire.

In some embodiments, the weight calculation logic component 404 can calculate loss values of neurons directly and indirectly connected to the first neuron 410. The weight calculation logic component 404 can determine loss values of neurons A1-3 directly connected to the first neuron 410 to be greater than loss values of corresponding neurons RN1 indirectly connected to the first neuron 410.

Figure 5:
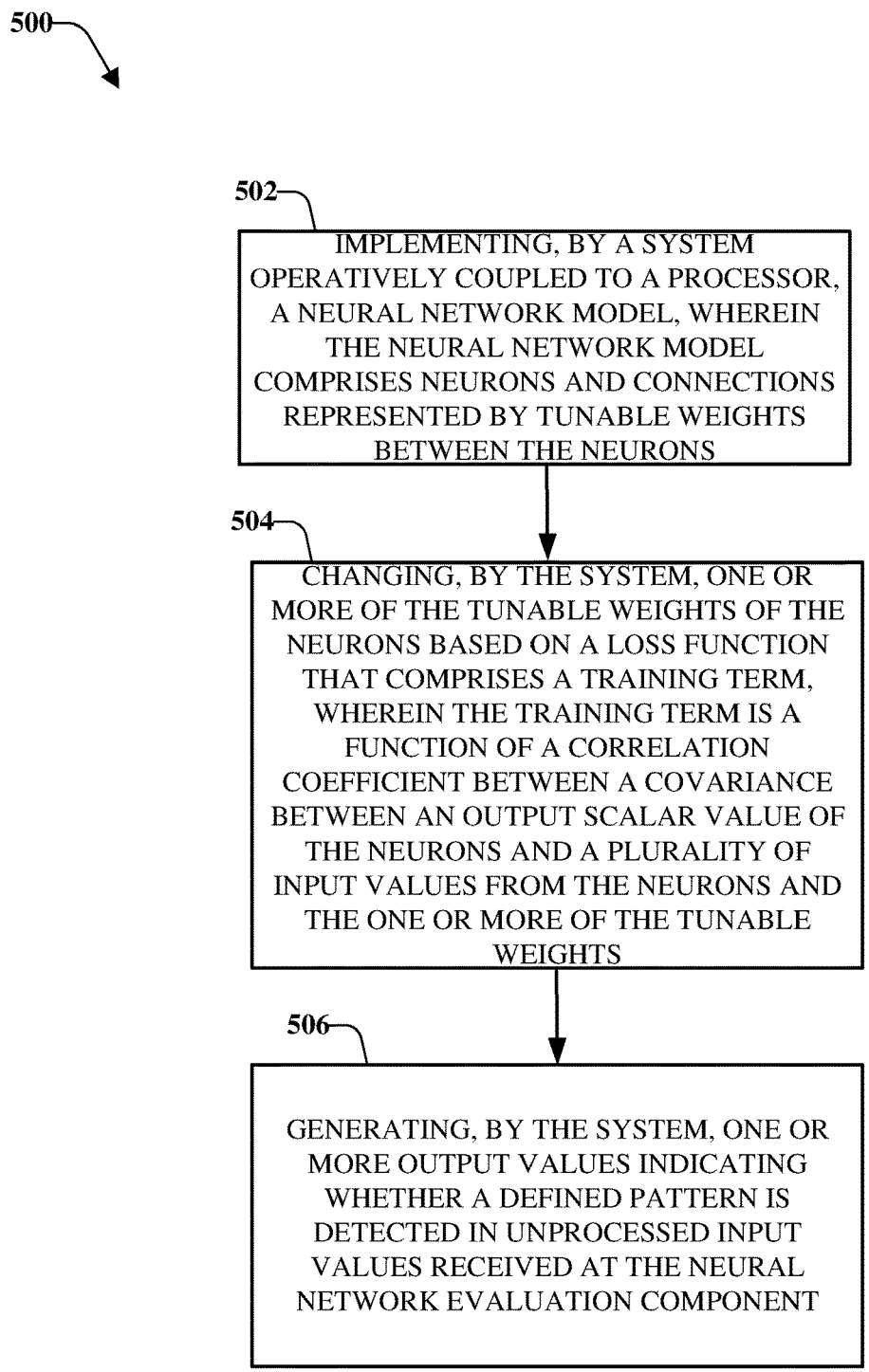
FIG. 5 illustrates a flow diagram of an example, non-limiting computer-implemented method that facilitates implementing an artificial neural network in accordance with one or more embodiments described herein.

FIG. 5 illustrates a flow diagram 500 of an example, non-limiting computer-implemented method that facilitates implementing an artificial neural network in accordance with one or more embodiments described herein. In some examples, flow diagram 500 can be implemented by system 100 or system 200. It can be appreciated that the operations of flow diagram 500 can be implemented in a different order than is depicted. It can also be appreciated that the operations of flow diagram 500 can be implemented in a different order than is depicted.

Operation 502 depicts implementing (e.g., by a neural network evaluation component 102) a neural network model, wherein the neural network model comprises neurons and connections represented by tunable weights between the neurons. Operation 504 depicts changing (e.g., loss function logic component 104) one or more of the tunable weights of the neurons based on a loss function that comprises a training term, wherein the training term is a function of a correlation coefficient between a covariance between an output scalar value of the neurons and a plurality of input values from the neurons and the one or more of the tunable weights. Operation 506 depicts generating (e.g., by the output component 106) one or more output values indicating whether a defined pattern is detected in unprocessed input values received at the neural network evaluation component.

Figure 6:
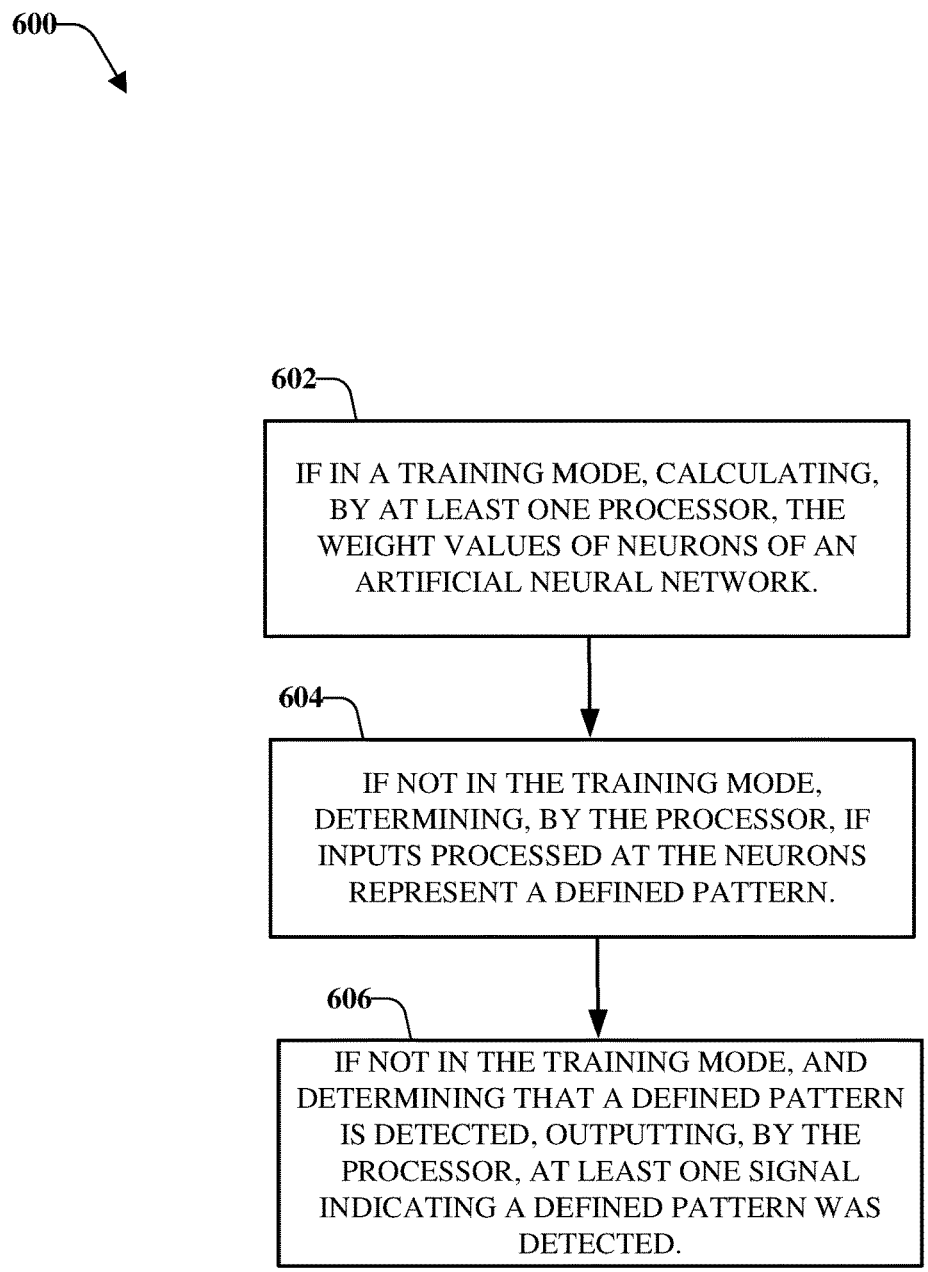
FIG. 6 illustrates a flow diagram of an example, non-limiting computer-implemented method that facilitates implementing an artificial neural network in accordance with one or more embodiments described herein.

FIG. 6 illustrates a flow diagram 600 of an example, non-limiting computer-implemented method that facilitates implementing an artificial neural network in accordance with one or more embodiments described herein. In some examples, flow diagram 600 can be implemented by system 400. It can be appreciated that the operations of flow diagram 600 can be implemented in a different order than is depicted. It can also be appreciated that the operations of flow diagram 600 can be implemented in a different order than is depicted.

The example computer-implemented method 600 begins if in a training mode, calculating, at operation 602 (e.g., by the training component 202) the weight values of neuron of an ANN. A particular weight value of a first neuron is calculated based, at least in part, on a loss function, for example. The loss function can be based on a correlation coefficient between a covariance between an output scalar value of the neurons and a plurality of input values from the neurons and the one or more of the tunable weights.

At operation 604, if not in the training mode, the method 600 can comprise determining (e.g., by the output component 106), if inputs processed at the neurons represent a detectable pattern.

At operation 606, if not in the training mode and determining that a defined pattern is detected, the method 600 can comprise outputting (e.g., by the output component 106) at least one signal indicating a defined pattern was detected.

Figure 7:
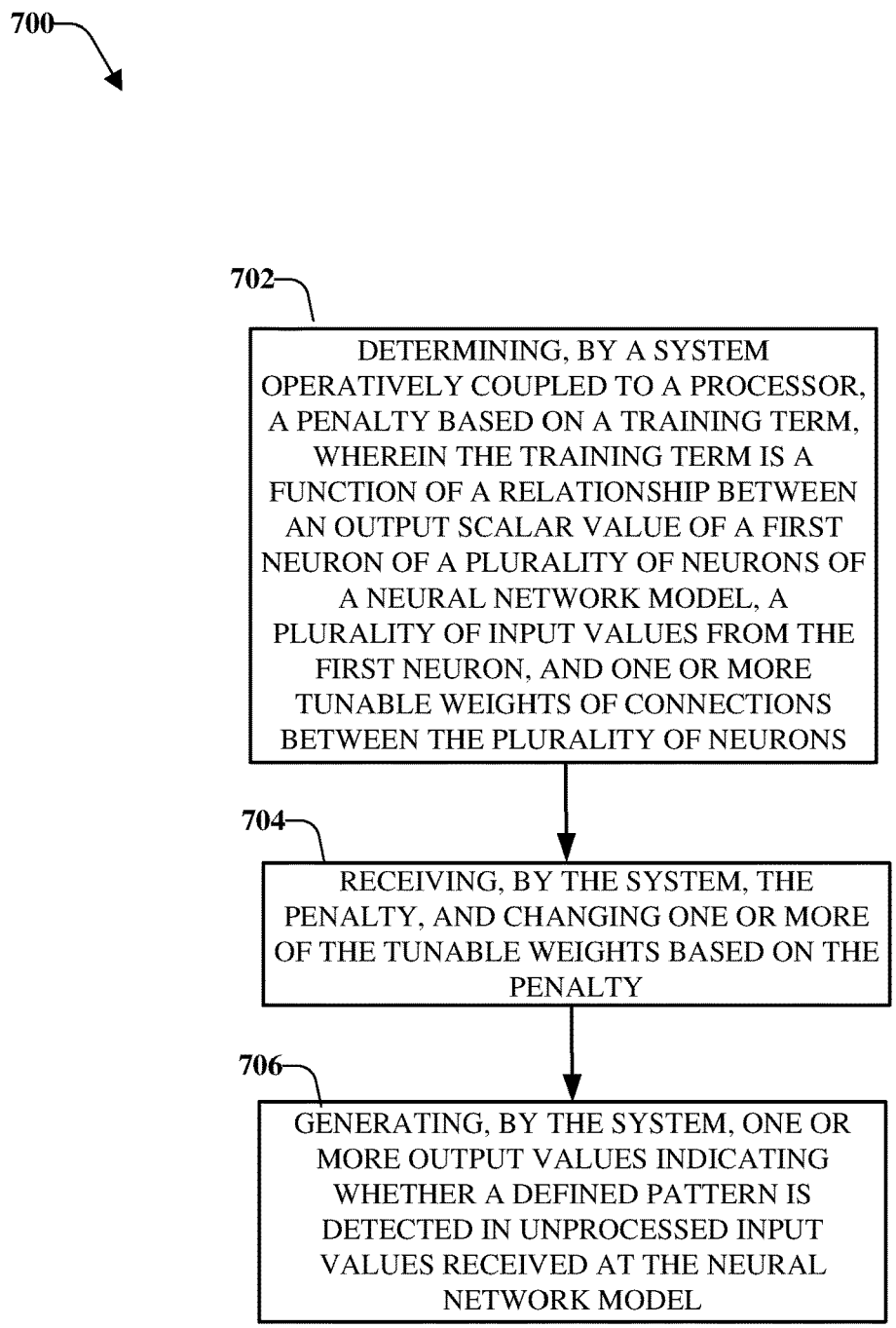
FIG. 7 illustrates a flow diagram of an example, non-limiting computer-implemented method that facilitates implementing an artificial neural network in accordance with one or more embodiments described herein.

FIG. 7 illustrates a flow diagram of an example, non-limiting computer-implemented method 700 that facilitates implementing an artificial neural network in accordance with one or more embodiments described herein. In some examples, flow diagram 700 can be implemented by system 800. It can be appreciated that the operations of flow diagram 700 can be implemented in a different order than is depicted. It can also be appreciated that the operations of flow diagram 700 can be implemented in a different order than is depicted.

Operation 702 depicts determining (e.g., by system 800) a penalty based on a training term, wherein the training term is a function of a relationship between an output scalar value of a first neuron of a plurality of neurons of a neural network model, a plurality of input values from the first neuron, and one or more tunable weights of connections between the plurality of neurons. This penalty can be a numerical value that indicates how much to adjust the one or more tunable weights, and can be inversely proportional to an amount of the relationship (e.g., covariance) between the output scalar value of a first neuron of a plurality of neurons of a neural network model, the plurality of input values from the first neuron, and the one or more tunable weights of connections between the plurality of neurons.

In some examples, the training term evaluates a plurality of output scalar samples, and gives a higher weight to output scalar samples that have a positive value than output scalar samples than have a negative value. In some examples, the training term evaluates a plurality of input value samples, and gives a higher weight to input value samples that have a positive value than input value samples than have a negative value. These weights can be used in determining a value with which to express an amount of the relationship between the output scalar value of a first neuron of a plurality of neurons of a neural network model, the plurality of input values from the first neuron, and the one or more tunable weights of connections between the plurality of neurons.

In some examples, the training term regularizes a first neuron of the plurality of neurons based on a first distribution, and the training term regularizes a second neuron of the plurality of neurons based on a second distribution, the first distribution differing from the second distribution. That is, in some examples, multiple distributions are used, and some neurons may be regularized using different distributions. In some examples, a different distribution can be used to regularize each neuron in a neural network model.

In some examples, the training term determines a covariance matrix of input values by weighted average over samples. In some examples, the training term determines a plurality of correlation coefficients by weighted average over samples.

In some examples, a weight of the one or more of the tunable weights for the first neuron is based on a correlation of the plurality of input values and the one or more tunable weights from other neurons of the plurality of neurons that are connected to the first neuron.

In some examples, the one or more tunable weights are indicative of how strongly the plurality of neurons are connected to one another.

In some examples, the relationship between the output scalar value of the first neuron, the plurality of input values from the first neuron, and the one or more of the tunable weights comprises a correlation coefficient between the output scalar value of the first neuron, the plurality of input values from the first neuron, and the one or more of the tunable weights.

In some examples, the plurality of neurons comprises hidden neurons and the neural network model further comprises: a first layer of the hidden neurons; a second layer of the hidden neurons adjacent to the first layer of the hidden neurons; and a third layer of the hidden neurons adjacent to the second layer of the hidden neurons. In such examples, a second neuron in the third layer of the hidden neurons can be connected to a third neuron in the second layer of the hidden neurons with a first weight of the one or more tunable weights. Such examples can also include a fourth neuron in the third layer of the hidden neurons that is directly connected to a fifth neuron in the first layer of the hidden neurons with a second weight that is different than the first weight.

In such examples, the third neuron in the second layer of the hidden neurons can be directly connected to the fifth neuron with a third weight of the tunable weights that is different from the first weight and the second weight. That is, different weights can be utilized for various connections between neurons in the neural network model. These examples are described with respect to FIG. 3, for example.

Operation 704 depicts receiving (e.g., by system 800) the penalty, and changing one or more of the tunable weights based on the penalty. In some examples, a penalty may be determined in operation 702 by one component of a system, and then the penalty may be applied in operation 702 (by changing one or more tunable weights) by another component of a system. In some examples, these components can be, respectively, loss function logic component 802 and optimizer component 804, and loss function logic component 802 can pass the penalty to optimizer component 804.

There can be examples where loss function logic component 802 is configured to change tunable weights for a single neuron at a time, whereas optimizer component 804 is configured to change tunable weights throughout the neural network component at once. In some examples, the one or more of the tunable weights are changed based on a logarithm function value of the training term.

Operation 706 depicts generating (e.g., by system 800) one or more output values indicating whether a defined pattern is detected in unprocessed input values received at the neural network model. In some examples, the defined pattern is indicative of one or more of a group consisting of at least a portion of an image, economic data, and a trend of data over a defined time period. These unprocessed input values can be data on which the neural network model is to operate after the neural network model has been trained (such as with labeled training data). Then detecting a defined pattern can comprise the neural network model performing its trained function on this input data (e.g., by evaluating economic data).

Figure 8:
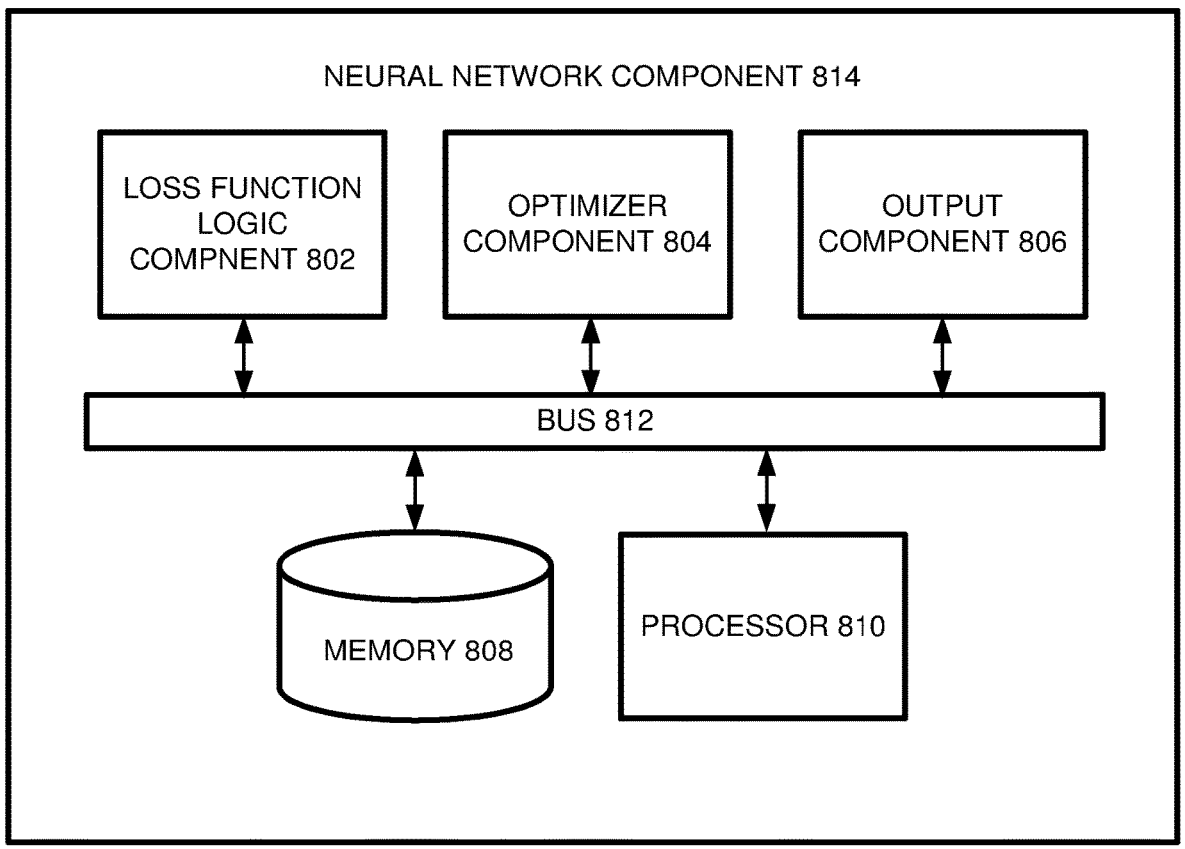
FIG. 8 illustrates a block diagram of an example, non-limiting system that facilitates an improved neural network in accordance with one or more embodiments described herein.

FIG. 8 illustrates a block diagram of an example, non-limiting system that facilitates an improved neural network in accordance with one or more embodiments described herein. Computer system 800 can include same or similar features and functionalities as computer system 1100. Repetitive description of like elements employed in respective embodiments is omitted for sake of brevity.

As shown in FIG. 8, computer system 800 can include neural network component 814. Neural network component 814 can include various computer-executable components, including, but not limited to, loss function logic component 802, optimizer component 804, and output component 806.

Neural network component 814 can also include or otherwise be associated with at least one memory 808 that stores computer-executable components (e.g., loss function logic component 802, optimizer component 804, and output component 806). Neural network component 814 can also include or otherwise be associated with at least one processor 810 that executes the computer-executable instructions stored in memory 808. Neural network component 814 can further include a system bus 812 that can couple the various components including, but not limited to, loss function logic component 802, optimizer component 804, and output component 806, memory 808, and/or processor 810.

In some examples, loss function logic component 802 can implement similar functionality as described with respect to operation 702. In some examples, optimizer component 804 can implement similar functionality as described with respect to operation 804. In some examples, output component 806 can implement similar functionality as described with respect to operation 706.

It should be appreciated that the architecture of computer system 800 can vary. For example, although various components of computer system 800 are depicted as being contained within neural network component 814, it can be appreciated that this arrangement is logical rather than indicating that the various components are contained within one device. That is, the various components may be distributed among various computing devices in a networked or distributed computing environment. It may also be appreciated that there may be other suitable architectures that employ more or fewer components than are depicted in computer system 800.

Figure 9:
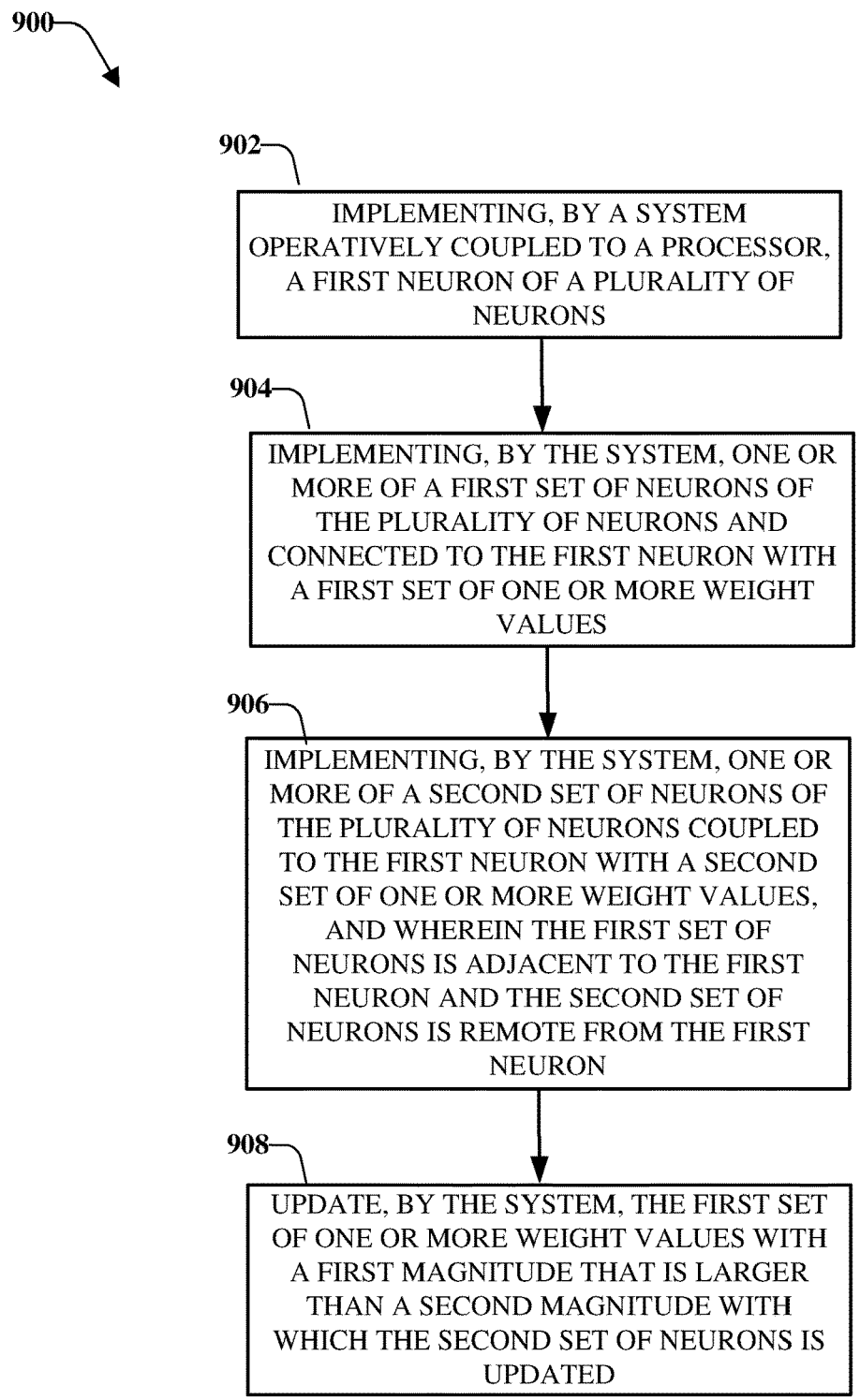
FIG. 9 illustrates a flow diagram of an example, non-limiting computer-implemented method that facilitates implementing an artificial neural network in accordance with one or more embodiments described herein.

FIG. 9 illustrates a flow diagram of an example, non-limiting computer-implemented method that facilitates implementing an artificial neural network in accordance with one or more embodiments described herein. In some examples, flow diagram 900 can be implemented by system 400 or operating environment 1100. It can be appreciated that the operations of flow diagram 900 can be implemented in a different order than is depicted. It can also be appreciated that the operations of flow diagram 900 can be implemented in a different order than is depicted.

Operation 902 depicts implementing (e.g., by system 400) a first neuron of a plurality of neurons. Operation 904 depicts implementing (e.g., by system 400) one or more of a first set of neurons of the plurality of neurons and connected to the first neuron with a first set of one or more weight values. Operation 906 depicts implementing (e.g., by system 400) one or more of a second set of neurons of the plurality of neurons coupled to the first neuron with a second set of one or more weight values, and wherein the first set of neurons is adjacent to the first neuron and the second set of neurons is remote from the first neuron.

Operation 908 depicts updating (e.g., by system 400) the first set of one or more weight values with a first magnitude that is larger than a second magnitude with which the weight calculation logic component updates the second set of neurons.

Figure 10:
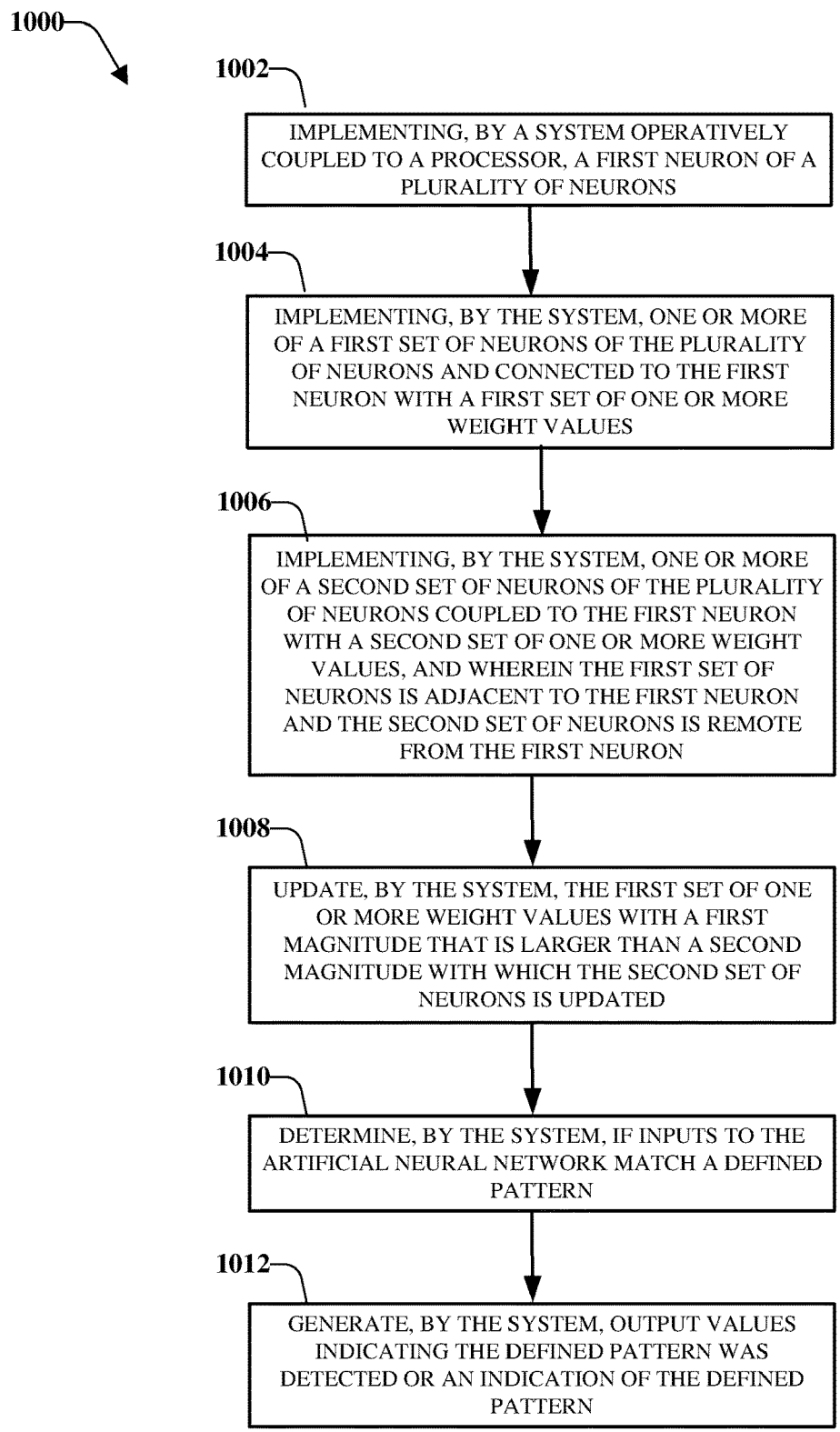
FIG. 10 illustrates a flow diagram of an example, non-limiting computer-implemented method that facilitates implementing an artificial neural network in accordance with one or more embodiments described herein.

FIG. 10 illustrates a flow diagram of an example, non-limiting computer-implemented method that facilitates implementing an artificial neural network in accordance with one or more embodiments described herein. In some examples, flow diagram 1000 can be implemented by system 400 or operating environment 1100. It can be appreciated that the operations of flow diagram 1000 can be implemented in a different order than is depicted. It can also be appreciated that the operations of flow diagram 1000 can be implemented in a different order than is depicted.

Operation 1002 depicts implementing (e.g., by system 400) a first neuron of a plurality of neurons. Operation 1004 depicts implementing (e.g., by system 400) one or more of a first set of neurons of the plurality of neurons and connected to the first neuron with a first set of one or more weight values. Operation 1006 depicts implementing (e.g., by system 400) one or more of a second set of neurons of the plurality of neurons coupled to the first neuron with a second set of one or more weight values, and wherein the first set of neurons is adjacent to the first neuron and the second set of neurons is remote from the first neuron.

Operation 1008 depicts updating (e.g., by system 400) the first set of one or more weight values with a first magnitude that is larger than a second magnitude with which the weight calculation logic component updates the second set of neurons. Operation 1010 depicts determining (e.g., by system 400) if inputs to the artificial neural network match a defined pattern. In some examples, the defined pattern is indicative of medical data or image data. Operation 1012 depicts outputting (e.g., by system 400) values indicating the defined pattern was detected or an indication of the defined pattern.

As earlier mentioned, the concepts, expressions, and ideas contained herein can be implemented in different embodiments and in different ways as understood by one of ordinary skill in this art. For example, another embodiment can make use of and manipulate "labels" when implementing Hebb's law. In general, a "label" is a descriptive term used to classify data patterns and/or sub-patterns that a neural network is attempting to extract from data presented to the network. For example, a neural network can be tasked with extracting data from image data. In this case, a label for "optical image data" can be applied to the overall image when first analyzed by the neural network. At another analysis level, the image can be broken down into two or more sub-parts such as "urban area" and "rural" area, for example. The data representing "urban area" can again be broken down by the network into "building", "horse" and "car" labels as well as other labels. The label for car can be sub-labeled with "tire", "roof", "bumper" and other labels. The "horse" label can be sub-labeled "head", "body" and "leg", for example.

Some embodiments can extract and use labels. These labels can be extracted from data using sub-neural networks that can be part of one large "deep" learning ANN and/or other independent smaller neural networks as understood by those of ordinary skill in this art. Weight values of neurons represented by the implemented neural network of choice can then be updated based on labels (label values) and a Hebbian loss value. For example, when a label and loss value agree or both agree, then the inputs to a neuron within the network are modified (e.g., weights on inputs to a neuron within the network are modified to be consistent with the output of a neuron) so the neuron's output is re-enforced. If there is a disagreement, then the input values are weighted accordingly (reduced). In another embodiment, if an upper level label such as "car" agrees with a lower layer label "tire" then weights are updated accordingly. When they disagree, by returning unmatched labels of "car" and "leg" (instead of "tire") then there is a disagreement and the corresponding weights are not updated or are updated accordingly based on the mismatch.

In another embodiment, a neural network can modify weights on neurons based on the outputs of internal neurons independent of the labels as well as non-adjacent neuron outputs of neurons that are nearby and "local" but not directly connected to a neuron currently being updated. Thus, this embodiment essentially allows a neuron to update another "remote" neuron it is not directly connect with, which can violate the "laws/rules" of "real" biological neural networks and neurons in nature.

Accordingly, in one embodiment, updating of weights can be based on both the information from the labels and to make the weights on inputs to a neuron within the network modified to be consistent with the output of a neuron. In another embodiment, weights on other neurons can be modified based on the outputs of internal neurons independent of the labels.

Figure 11:
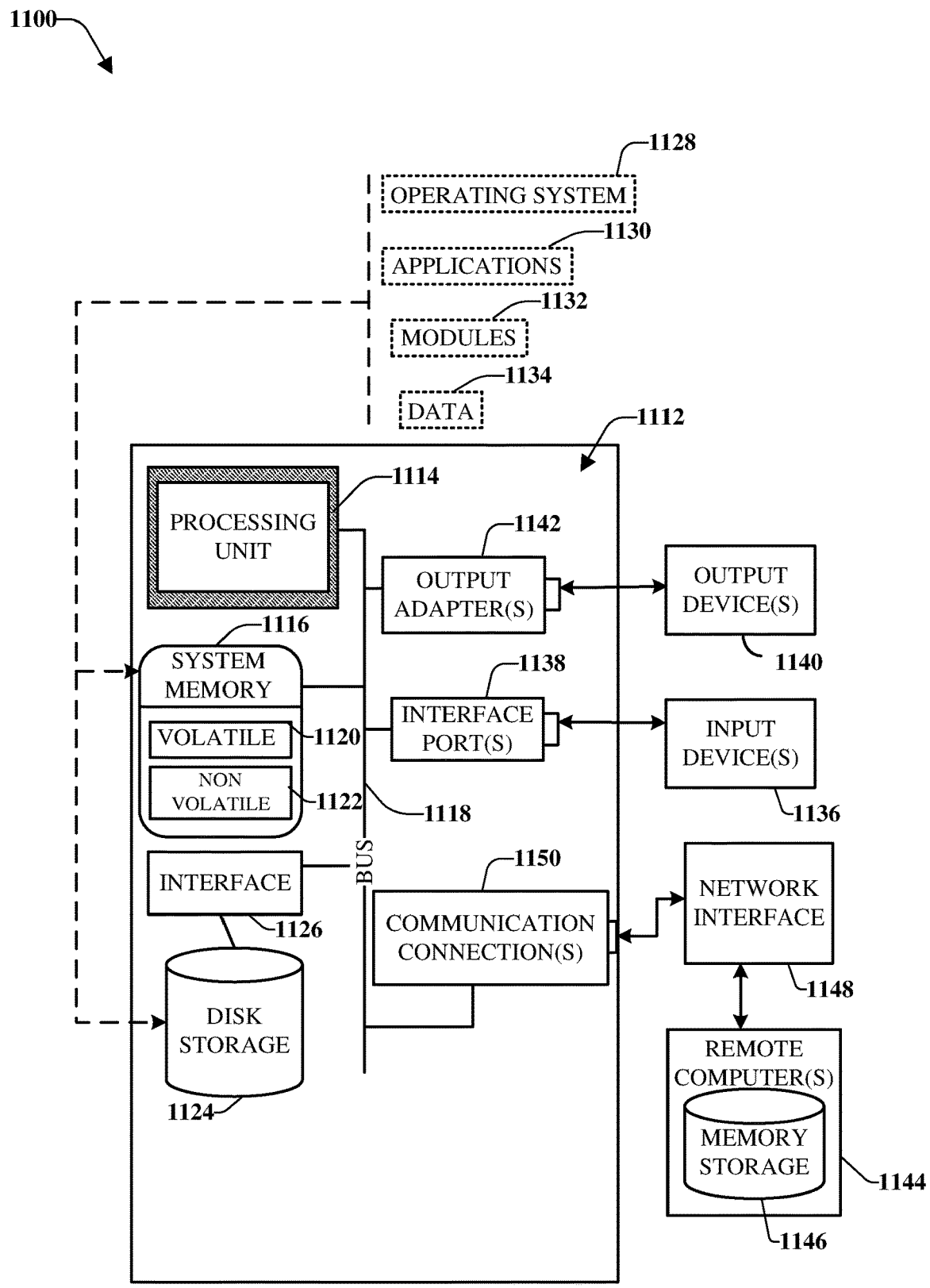
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity. With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory; and
a processor that executes computer executable components stored in the memory, wherein the computer executable components comprise:
a training component that determines a penalty based on a training term, wherein the training term is a logarithmic function of a defined value, wherein the defined value comprises:
a reflective correlation coefficient between:
a covariance associated with an output scalar value of a first neuron of a plurality of neurons of a neural network model, and at least one of a plurality of input values from the first neuron; and
one or more tunable weights of connections between the plurality of neurons;
receives the penalty, and changes one or more of the tunable weights based on the penalty and on the number of intermediate neurons between the first neuron and the one or more weights;
generates one or more output values indicating whether a defined pattern is detected in unprocessed input values received at the neural network model
compares the output values to a loss value calculated using a loss function comprising the training term; and
modifies the input values received at the neural network model based on the results of the comparison.

2. The system of claim 1, wherein the relationship between the output scalar value of the first neuron, the plurality of input values from the first neuron, and the one or more of the tunable weights comprises a correlation coefficient between the output scalar value of the first neuron, the plurality of input values from the first neuron, and the one or more of the tunable weights, and wherein the defined value is divided by 2.

3. The system of claim 1, wherein the training term evaluates a plurality of output scalar samples, and gives a higher weight to output scalar samples that have a positive value than output scalar samples than have a negative value.

4. The system of claim 1, wherein the training term evaluates a plurality of input value samples, and gives a higher weight to input value samples that have a positive value than input value samples than have a negative value.

5. The system of claim 1, wherein the processor also changes the one or more of the tunable weights based on a logarithm function value of the training term.

6. The system of claim 1, wherein a weight of the one or more of the tunable weights for the first neuron is based on a correlation of the plurality of input values and the one or more tunable weights from other neurons of the plurality of neurons that are connected to the first neuron.

7. The system of claim 1, wherein the defined pattern is indicative of one or more of a group consisting of: at least a portion of an image, economic data, and a trend of data over a defined time period.

8. The system of claim 1, wherein the one or more tunable weights are indicative of how strongly the plurality of neurons are connected to one another.

9. A computer-implemented method, comprising:
training, by a system operatively coupled to a processor, a neural network model, wherein the training comprises:
determining, by the system, a penalty based on a training term, wherein the training term is a logarithmic function of a relationship between an output scalar value of a first neuron of a plurality of neurons of the neural network model, a plurality of input values from the first neuron, and one or more tunable weights of connections between the plurality of neurons;

receiving, by the system, the penalty, and changing one or more of the tunable weights based on the penalty and on the number of intermediate neurons between the first neuron and the one or more of the tunable weights;

generating, by the system, one or more output values indicating whether a defined pattern is detected in unprocessed input values received at the neural network model;

comparing, by the system, the output values to a loss value calculated using a loss function comprising the training term; and modifies the input values received at the neural network model based on the results of the comparison.

10. The computer-implemented method of claim 9, wherein the relationship between the output scalar value of the first neuron and the plurality of input values from the first neuron and the one or more of the tunable weights comprises a correlation coefficient between a coefficient between the output scalar value of the first neuron, the plurality of input values from the first neuron, and the one or more of the tunable weights.

11. The computer-implemented method of claim 9, wherein the training term evaluates a plurality of output scalar samples, and gives a higher weight to output scalar samples that have a positive value than output scalar samples than have a negative value.

12. The computer-implemented method of claim 9, wherein the training term evaluates a plurality of input value samples, and gives a higher weight to input value samples that have a value samples than have a negative value.

13. The computer-implemented method of claim 9, wherein changing the one or more of the tunable weights is based on a logarithm function value of the training term.

14. The computer-implemented method of claim 9, wherein the plurality of neurons comprise hidden neurons and wherein the neural network model further comprises:
a first layer of the hidden neurons;
a second layer of the hidden neurons adjacent to the first layer of the hidden neurons; and
a third layer of the hidden neurons adjacent to the second layer of the hidden neurons, wherein a second neuron in the third layer of the hidden neurons is connected to a third neuron in the second layer of the hidden neurons with a first weight of the one or more tunable weights.

15. The computer-implemented method of claim 14, wherein a fourth neuron in the third layer of the hidden neurons is directly connected to a fifth neuron in the first layer of the hidden neurons with a second weight that is different than the first weight.

16. The computer-implemented method of claim 15, wherein the third neuron in the second layer of the hidden neurons is directly connected to the fifth neuron with a third weight of the tunable weights that is different from the first weight and the second weight.

17. A computer program product for training a neural network model, the computer program product comprising a computer readable storage medium having program instructions embodied therewith, the program instructions are executable by a processor to at least:

determine, by the processor, a penalty based on a training term, wherein the training term is a logarithmic function of a relationship between an output scalar value of a first neuron of a plurality of neurons of the neural network model, a plurality of input values from the first neuron, and one or more tunable weights of connections between the plurality of neurons;

receive, by the processor, the penalty, and changing one or more of the tunable weights based on the penalty and on the number of intermediate neurons between the first neuron and the one or more of the tunable weights;

generate, by the processor, one or more output values indicating whether a defined pattern is detected in unprocessed input values received at the neural network model;

compare, by the processor, the output values to a loss value calculated using a loss function comprising the training term; and modify, by the processor, the input values received at the neural network model based on the results of the comparison.

18. The computer program product of claim 17, wherein the training term regularizes a first neuron of the plurality of neurons based on a first distribution, and wherein the training term regularizes a second neuron of the plurality of neurons based on a second distribution, the first distribution differing from the second distribution.

19. The computer program product of claim 17, wherein the training term determines a covariance matrix of input values by weighted average over samples.

20. The computer program product of claim 17, wherein the training term determines a plurality of correlation coefficients by weighted average over samples.

21. A system, comprising:
an artificial neural network (ANN) comprising:
a first neuron of a plurality of neurons;
one or more of a first set of neurons of the plurality of neurons and connected to the first neuron with a first set of one or more weight values; and
one or more of a second set of neurons of the plurality of neurons coupled to the first neuron with a second set of one or more weight values, and wherein the first set of neurons is adjacent to the first neuron and the second set of neurons is remote from the first neuron;
a memory that stores computer executable components; and
a processor that executes the computer executable components stored in the memory, wherein the computer executable components comprise:
a training component that updates the first set of one or more weight values with a first magnitude that is larger than a second magnitude with which the training component updates the second set of neurons, wherein the update is based on a loss function that comprises a training term that is a function of a correlation coefficient between a covariance between at least an output scalar value of the neurons and a plurality of input values from the neurons and on the number of intermediate neurons between the first neuron and the second set of neurons; and
an output component that:
determines if inputs to the artificial neural network match a defined pattern;
generates output values indicating the defined pattern was detected or an indication of the defined pattern;

compares the output values to a loss value calculated using the loss function; and modifies the inputs to the artificial neural network based on the results of the comparison.

22. A computer program product for training an artificial neural network, the computer program product comprising a computer readable storage medium having program instructions embodied therewith, the program instructions are executable by a processor to at least:

implement, by the processor, a first neuron of a plurality of neurons;

implement, by the processor, one or more of a first set of neurons of the plurality of neurons and connected to the first neuron with a first set of one or more weight values;

implement, by the processor, one or more of a second set of neurons of the plurality of neurons coupled to the first neuron with a second set of one or more weight values, and wherein the first set of neurons is adjacent to the first neuron and the second set of neurons is remote from the first neuron;

update, by the processor, the first set of one or more weight values with a first magnitude that is larger than a second magnitude with which the second set of neurons is updated, wherein the update is based on a loss function that comprises a training term that is a function of a correlation coefficient between a covariance between an output scalar value of the neurons and a plurality of input values from the neurons and the one or more weight values and on the number of intermediate neurons between the first neuron and the second set of neurons;

determine, by the processor, if inputs to the artificial neural network match a defined pattern;

generate, by the processor, output values indicating the defined pattern was detected or an indication of the defined pattern;

compare, by the processor, the output values to a loss value calculated using the loss function; and modify, by the processor, the inputs to the artificial neural network based on the results of the comparison.

23. The computer program product of claim 22, wherein the defined pattern is indicative of medical data or image data.

* * * * *